Nov. 10, 1959 — K. LAWITSCHKA — 2,912,292
OIL CONTROL RING
Filed Dec. 11, 1957

INVENTOR
Kurt Lawitschka
By
Patent Agent

United States Patent Office 2,912,292
Patented Nov. 10, 1959

2,912,292

OIL CONTROL RING

Kurt Lawitschka, Koln, Germany, assignor to Klockner-Humboldt-Deutz Aktiengesellschaft, Koln, Germany Application December 11, 1957, Serial No. 702,121

Claims priority, application Germany December 19, 1956

6 Claims. (Cl. 309—45)

The present invention relates to an oil control ring provided with two annular flanges for use in connection with pistons of piston engines. Such control rings have in practice proved the more efficient the smaller at a certain pressing force the sliding surfaces of the annular flanges have been dimensioned. This means that such control rings are the more efficient the higher the specific surface pressure of the sliding surfaces with regard to the cylinder surface is selected. Since on the other hand the wear increases with specific surface pressure, it will be appreciated that with a reduction in the sliding surface, the life of the rings is shortened while furthermore with most shapes of the ring with increasing wear the separating or stripping-off effect of the rings will be reduced. In an effort to increase the wear resistance of small sliding surfaces, the said small sliding surfaces have for instance by hard chroming been made more wear resistant than the basic material of the ring. This, however, has the drawback that the full separating or stripping-off effect will be obtained only after a relatively long wearing-in period because the wearing-in of such rings is effected only very slowly, while on the other hand during the running-in period there exists the danger of seizing.

It is, therefore, an object of the present invention to provide an oil control ring with at least two annular flanges which will overcome the above mentioned drawbacks.

It is another object of this invention to provide an oil control ring with at least two annular flanges in such a way that while resting against the inner cylinder wall through the intervention of relatively small sliding surfaces, it will nevertheless have considerably improved wearing-in properties and will have a considerably longer life than heretofore known rings of the type involved.

These and other objects and advantages of the invention will appear more clearly from the following specification in connection with the accompanying drawing, in which.

General arrangement

Figure 1:
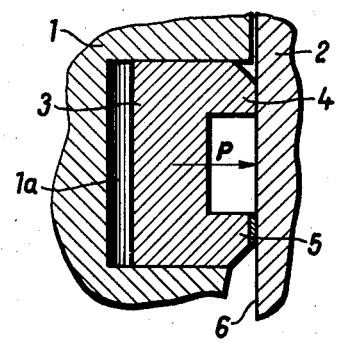
Fig. 1 represents a portion of a cross section through a piston provided with an oil control ring according to the present invention.

The oil control ring according to the present invention is characterized primarily in that the sliding surface of one of the two annular flanges only of a two-flange ring is more wear-resistant that the basic material of the ring. According to the invention, this higher wear resistance of the sliding surface of the said one flange may be obtained in any desired manner, for instance by hard chroming or nitrating.

The favorable behavior of the ring according to the invention is based on the fact that with even specific surface pressure on the sliding surfaces, the less wear resistant sliding surface will wear faster than the other. However, this wear is limited by the torsion or twist resistance of the ring which opposes the pressing force. With increasing wear, the ratio of the specific surface pressure on the two sliding surfaces changes more and more in the direction toward an increase of the specific surface pressure on the hardened sliding surface with a corresponding decrease of the specific surface pressure in the other sliding surface. The total wear and thus the life span of the ring is thus, after the deformation limit during the wearing-in period has been obtained dependent primarily on the behavior of the more wear-resistant sliding surface. The wearing-in period of the ring according to the present invention can be shortened by dimensioning the less wear-resistant sliding surface smaller than the more wear-resistant sliding surface. This means the wearing-in period for the ring according to the invention can be shortened by taking care that already at the start of operation of the ring according to the invention the specific surface pressure acting upon the softer sliding surface will be higher than the specific surface pressure acting on the other sliding surface. Additionally or alternatively, in further development of the invention, the wearing-in period can furthermore be reduced, provded a self-tightening ring is involved by shaping the cross section of the ring in a manner known per se non-symmetrically, for instance by providing an inner chamfer, that when starting the operation of the ring on the flange with higher wear-resistant sliding surface a pressing force will be effective which is lower than that acting upon the other flange.

According to a further feature of the invention, the less wear-resistant sliding surface is provided with an annular flange which prior to the use of the ring is radially over-dimensioned. If the cross section of such a ring is so dimensioned that the latter is adapted following its installation to deform under the effect of the total pressing force, the two flanges will rest against the inner surface of the cylinder and the total pressing force will be non-symmetrically distributed in such a way that a higher proportion of pressing force will be effective on the radially over-dimensioned flange. If, on the other hand, a substantially more torsion or twist-resistant ring is involved, also after the installation of the ring, first only the radially over-dimensioned flange will with the total pressing force through the intervention of its sliding surface be pressed against the inner surface of the cylinder.

Structural arrangement

Referring now to the drawing in detail and Fig. 1 thereof in particular, an oil control ring 3 shown therein and arranged in a groove 1a of a piston 1 has a U-shaped cross section. Flanges 4 and 5 of the ring 3 rest against the inner cylindrical surface 6 of cylinder 2. The sliding surface of the flange 5 is hard-chromed and more wear resistant than the sliding surface of the flange 4 which consists of the basic material of the ring 3. In operation, the surface of the flange 4 will wear more than the sliding surface of the flange 5. Due to the uneven wear, the ring 3 will undergo a slight torsion or twisting limited by the rigidity of the ring. The said wear is completed as soon as the force opposing the said torsion or twisting has reached the magnitude of the pressing force effective in the respective flange. After the torsion or twisting limit has been obtained, practically the total pressing force is effective in the flange 5. Thus, the life of the ring following its wearing-in period is primarily dependent on the condition of the sliding surface of the flange 5.

Figure 2:
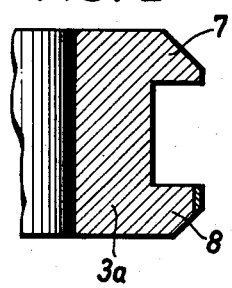
Fig. 2 is a cross section through a portion of an oil control ring according to the invention which is slightly modified over the oil ring shown in Fig. 1.

Ring 3a illustrated in Fig. 2 is designed substantially similar to that of Fig. 1. The ring of Fig. 2 differs primarily from the ring of Fig. 1 in that the less wear-resistant sliding surface of flange 7 is narrower than the sliding surface of flange 8. In this way, from the start an increased specific surface pressure in the sliding surface of flange 7 is assured whereby the running-in period will be shortened.

Figure 3:
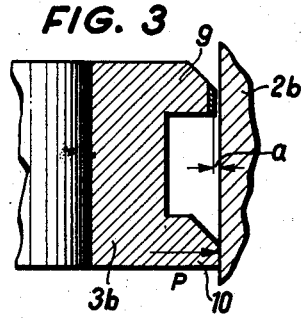
Fig. 3 is a cross section through a portion of a cylinder and a still further modified oil control ring according to the invention.

With the ring 3b illustrated in Fig. 3, the sliding surface of upper flange 9 is hard-chromed and more wear resistant than the sliding surface of the lower flange 10. Flange 10 is slightly radially oversized by a distance a with regard to the flange 9 so that ring 3b which is to be considered as rather torsion or twist resistant, following the installation, will at first rest with full pressing force P against the inner surface of cylinder 2b by means of the flange 10 only. The flange 10 will wear quicker which fact again reduces the wearing-in period. When after a certain period of operation, the sliding surface of the flange 9 likewise comes into sliding contact with the inner surface of cylinder 2b, the pressing force P will be evenly distributed over the two sliding surfaces. If a ring is involved which at this time is still able to twist or to be subjected to torsion, the ring will behave further precisely in the same manner as ring 3 of Fig. 1. This means that a wear of the flange 10 will occur beyond the magnitude a.

Figure 4:
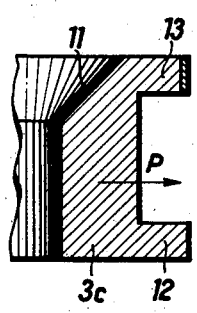
Fig. 4 is a cross section through a portion of a control ring according to the invention which differs from the control rings according to Figs. 1 to 3 primarily in that it is provided with a chamfer near one of the annular flanges.

Ring 3c illustrated in Fig. 4 differs from the rings of Figs. 1 to 3 primarily by a chamfer 11 as a result of which ring 3c has a non-symmetrical cross section so that in the less wear-resistant flange 12 a greater proportion of the total pressing force P will be effective than in flange 13. This non-symmetrical cross-sectional shape also brings about a reduction of the wearing-in period.

Figure 5:
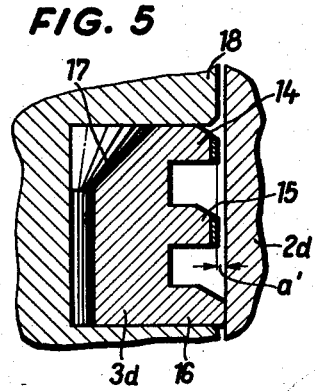
Fig. 5 is a cross section through a portion of a cylinder and piston and of a further modified ring according to the invention which ring is provided with three annular flanges.

Fig. 5 illustrates a ring 3d according to the invention with three flanges 14, 15 and 16. The sliding surfaces of the flanges 14, 15 are hard-chromed and are more wear resistant than the sliding surface of the flange 16 which latter is radially oversized by the distance a with regard to the flanges 14 and 15. Furthermore, the cross section of the ring 3d is non-symmetrical in view of a chamfer 17. After the ring 3d has been installed in a piston 18, it rests against the inner surface of cylinder 2d first through the intervention of the flanges 14 and 16 while due to the non-symmetrical cross-sectional shape of ring 3d and the over-dimension a', the greater proportion of the total pressing force will be effective in the flange 16. After a certain period of operation, also flanges 14 and 15 will slide on the inner surface of cylinder 2d. From this time on, the total wear will be dependent merely on the durability of the hard sliding surfaces of the flanges 14 and 15. The sliding surface of flange 16 will from the said time on be approximately under no load.

With regard to the magnitude of the over-dimension "a" in Fig. 3 and "a'" in Fig. 5, these values may preferably be for instance within the range from 0.02 millimeter to 0.1 millimeter.

It is, of course, to be understood that the present invention is, by no means, limited to the particular constructions shown in the drawing but also comprises any modifications within the scope of the appended claims.

What I claim is:

1. An oil control ring consisting of a single integral piece for insertion in pistons, which has only two spaced peripheral flanges, the outer peripheral surface of only one of said flanges having a higher wear resistance than the outer peripheral surface of the other flange.

2. An oil control ring consisting of a single integral piece for insertion in pistons, which has two peripheral flanges spaced from each other and of different width, the peripheral outer surface of the flange of smaller width being less wear resistant than the outer peripheral surface of the other flange of greater width.

3. An oil control ring consisting of a single integral piece for insertion in pistons, which has at least two spaced peripheral flanges, the outer peripheral surface of one of said flanges having a higher wear resistance than the outer peripheral surface of the other flange, said ring having a non-symmetrical cross section with regard to the transverse axis of said ring whereby during the running-in period of said ring the flange with the outer peripheral surface of higher wear resistance will be subjected to a lower pressing force than the flange with the outer peripheral surface of lower wear resistance.

4. An oil control ring consisting of a single integral piece for insertion in pistons, which has at least two spaced peripheral flanges, the outer peripheral surface of one of said flanges having a higher wear resistance than the outer peripheral surface of the other flange, the flange which has an outer peripheral surface of lower wear resistance having a slightly greater outer diameter than the flange having an outer peripheral surface of higher wear resistance.

5. An oil control ring consisting of a single integral piece for insertion in pistons, which comprises three spaced peripheral flanges, the outer peripheral surface of one of said flanges having a lower wear resistance than the outer peripheral surface of the other two flanges, said flange with an outer peripheral surface of lower wear resistance being arranged at one end of said ring in axial direction thereof and having a slightly greater outer diameter than the other two flanges.

6. An oil control ring consisting of a single integral piece for insertion into pistons, which has a plurality of peripheral flanges, each of said flanges having a peripheral surface for engagement with the inner wall of a cylinder receiving said piston, said peripheral surfaces with the exception of at least one of said peripheral surfaces being more wear resistant than the material of which said piston is made.

References Cited in the file of this patent

UNITED STATES PATENTS

| | | |
|---|---|---|
| 1,853,937 | Solenberger | Apr. 12, 1932 |
| 2,319,454 | Hamm | May 18, 1943 |
| 2,511,874 | Phillips | June 20, 1950 |
| 2,761,749 | Marien | Sept. 4, 1956 |